(12) United States Patent
Cao et al.

(10) Patent No.: US 11,748,970 B2
(45) Date of Patent: Sep. 5, 2023

(54) HARDWARE ENVIRONMENT-BASED DATA QUANTIZATION METHOD AND APPARATUS, AND READABLE STORAGE MEDIUM

(71) Applicant: INSPUR SUZHOU INTELLIGENT TECHNOLOGY CO., LTD., Jiangsu (CN)

(72) Inventors: Qichun Cao, Jiangsu (CN); Yaqian Zhao, Jiangsu (CN); Gang Dong, Jiangsu (CN); Lingyan Liang, Jiangsu (CN); Wenfeng Yin, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/794,110

(22) PCT Filed: Nov. 16, 2020

(86) PCT No.: PCT/CN2020/117338
§ 371 (c)(1),
(2) Date: Jul. 20, 2022

(87) PCT Pub. No.: WO2021/147362
PCT Pub. Date: Jul. 29, 2021

(65) Prior Publication Data
US 2023/0055313 A1    Feb. 23, 2023

(30) Foreign Application Priority Data
Jan. 21, 2020  (CN) .......................... 202010071063.1

(51) Int. Cl.
*G06V 10/00*    (2022.01)
*G06V 10/28*    (2022.01)

(52) U.S. Cl.
CPC .................................... *G06V 10/28* (2022.01)

(58) Field of Classification Search
CPC .......... G06N 3/045; G06N 3/063; G06N 3/08; G06N 3/048; G06N 3/04; G06N 3/082;
(Continued)

(56) References Cited

U.S. PATENT DOCUMENTS

2011/0188769 A1  8/2011  Fuchie et al.
2019/0138882 A1*  5/2019  Choi ...................... G06N 3/048
(Continued)

FOREIGN PATENT DOCUMENTS

CN          101854535          10/2010
CN          106485316          3/2017
(Continued)

OTHER PUBLICATIONS

Wang, Kuan, et al. "Haq: Hardware-aware automated quantization with mixed precision." Proceedings of the IEEE/CVF Conference on Computer Vision and Pattern Recognition. 2019.*
(Continued)

*Primary Examiner* — Li Liu
(74) *Attorney, Agent, or Firm* — CCOOPER LEGAL GROUP, LLC

(57) ABSTRACT

A hardware environment-based data quantization method includes: parsing a model file under a current deep learning framework to obtain intermediate computational graph data and weight data that are independent of a hardware environment; performing calculation on image data in an input data set through a process indicated by an intermediate computational graph to obtain feature map data; separately performing uniform quantization on the weight data and the feature map data of each layer according to a preset linear quantization method, and calculating a weight quantization factor and a feature map quantization factor (S103); com-
(Continued)

bining the weight quantization factor and the feature map quantization factor to obtain a quantization parameter that makes hardware use shift instead of division; and finally, writing the quantization parameter and the quantized weight data to a bin file according to a hardware requirement so as to generate quantized file data (S105).

20 Claims, 5 Drawing Sheets

(58) Field of Classification Search
CPC .... G06F 2207/4824; G06F 17/15; G06F 5/01; G06F 8/427; G06V 10/28; G06V 10/82
See application file for complete search history.

(56) References Cited

U.S. PATENT DOCUMENTS

| | | | |
|---|---|---|---|
| 2019/0391796 A1 | 12/2019 | Brady et al. | |
| 2020/0364552 A1* | 11/2020 | Guo | G06N 3/08 |
| 2021/0201117 A1* | 7/2021 | Ha | G06N 3/08 |
| 2021/0357736 A1* | 11/2021 | Lu | G06N 3/045 |
| 2022/0067527 A1* | 3/2022 | Xu | G06N 3/063 |

FOREIGN PATENT DOCUMENTS

| | | |
|---|---|---|
| CN | 108920177 | 11/2018 |
| CN | 109343978 | 2/2019 |
| CN | 109409531 | 3/2019 |
| CN | 109460827 | 3/2019 |
| CN | 110363297 | 10/2019 |
| CN | 110610237 | 12/2019 |
| CN | 111240640 A | 6/2020 |

OTHER PUBLICATIONS

Gysel, Philipp, Mohammad Motamedi, and Soheil Ghiasi. "Hardware-oriented approximation of convolutional neural networks." arXiv preprint arXiv:1604.03168 (2016).*
Hubara, Itay, et al. "Quantized neural networks: Training neural networks with low precision weights and activations." The Journal of Machine Learning Research 18.1 (2017): 6869-6898.*
Guo, Yunhui. "A survey on methods and theories of quantized neural networks." arXiv preprint arXiv:1808.04752 (2018).*
International Search Report and English Translation cited in PCT/CN2020/117338 dated Dec. 21, 2020, 6 pages.
Written Opinion and English Translation cited in PCT/CN2020/117338 dated Dec. 21, 2020, 8 pages.

* cited by examiner

HARDWARE ENVIRONMENT-BASED DATA QUANTIZATION METHOD AND APPARATUS, AND READABLE STORAGE MEDIUM

This application claims priority to Chinese Patent Application No. 202010071063.1, filed on Jan. 21, 2020, in China National Intellectual Property Administration and entitled "Hardware Environment-Based Data Quantization Method and Apparatus, and Readable Storage Medium", the contents of which are hereby incorporated by reference in its entirety.

FIELD

The present application relates to the technical field of Artificial Intelligence (AI), and particularly to a hardware environment-based data quantization method, apparatus, and a computer-readable storage medium.

BACKGROUND

With the development of AI in various field, such as agriculture, finance, security, health care, and manufacturing, users have made higher requirements for the calculation speed, accuracy, and power consumption of AI-technology-based products. Major hardware manufacturers develop and research special acceleration cards and corresponding matched quantization solutions for calculation of AI algorithms, thereby accelerating the popularization of the AI algorithms in daily use.

The characteristics of large scale and parallelism of AI acceleration cards confront the development of AI acceleration cards with great challenges, and meanwhile, quantization solutions need to achieve algorithm accuracy similar to that of high-accuracy operations by low-accuracy operations. In order to map high-accuracy data to low-accuracy data to reduce the hardware resource overhead, it is necessary to quantize the high-accuracy data in advance to generate low-accuracy weight data and quantization parameter files. The development of a quantization toolkit of a software side meets the above requirement.

However, the increasing variety of current deep learning frameworks makes it more difficult to adapt AI acceleration cards to models under various frameworks. In order to make a general quantization toolkit compatible with various frameworks, it is necessary to install various deep learning framework software in advance, which easily causes redundancies of host-side software and conflicts of various dependency libraries.

In view of this, how to solve the problems of software package redundancy and dependency library conflict caused by supporting a plurality of deep learning frameworks is a technical problem needed to be solved by those skilled in the art.

SUMMARY

The present application provides a hardware environment-based data quantization method and apparatus, and a computer readable storage medium, thereby solving the problems in the related art of software package redundancy and dependency library conflict caused by supporting a plurality of deep learning frameworks.

In order to solve the foregoing technical problem, embodiments of the present application provide the following technical solutions.

A first aspect of the embodiments of the present application provides a hardware environment-based data quantization method, including:

performing parsing according to a model file under a current deep learning framework to obtain intermediate computational graph data and weight data that are independent of a hardware environment;

performing, based on the intermediate computational graph data and the weight data, calculation on image data in an input data set through a process indicated by an intermediate computational graph to obtain feature map data;

separately performing uniform quantization on the weight data and the feature map data of each layer according to a preset linear quantization method, and calculating a weight quantization factor and a feature graph quantization factor;

combining the weight quantization factor and the feature map quantization factor to obtain a quantization parameter, wherein the quantization parameter is a parameter that makes hardware use shift instead of division; and writing the quantization parameter and the quantized weight data to a bin file according to a hardware requirement so as to generate quantized file data.

Optionally, before the step of writing the quantization parameter and the quantized weight data to the bin file according to the hardware requirement, the method further includes:

reordering the quantization parameter and the quantized weight data such that a data format of the quantization parameter and the quantized weight data is a 64-channel parallel format.

Optionally, the step of performing parsing to obtain intermediate computational graph data and weight data of the current deep learning framework includes:

parsing the model file by use of a Neural Network Virtual Machine (NNVM) component in an NNVM compiler to obtain the intermediate computational graph data; and by use of a Tensor Virtual Machine (TVM) component in the NNVM compiler, executing an operator of the intermediate computational graph, and calculating a tensor form of the weight data.

Optionally, the step of combining the weight quantization factor and the feature map quantization factor includes:

combining the weight quantization factor and the feature map quantization factor according to a quantization factor combination calculation formula, wherein the quantization factor combination calculation formula is:

$$y_w * y_f \approx \frac{1}{2^n},$$

wherein $y_w$ represents the weight quantization factor, $y_f$ represents the feature map quantization factor, and n represents the quantization parameter.

Optionally, the step of separately performing uniform quantization on the weight data and the feature map data of each layer according to the preset linear quantization method and calculating the weight quantization factor and the feature graph quantization factor includes:

calculating an average value of the feature map data of each layer as feature map average data of each layer;

statistically obtaining data distributions of the weight data and the feature map average data of each layer, and calculating corresponding limit values;

limiting the weight data and the feature map average data of each layer within corresponding limit ranges, wherein the limit range is determined according to the corresponding limit value; and uniformly quantizing the limited data between −127 and +127 of int8 data accuracy, and calculating the weight quantization factor and the feature map quantization factor.

Optionally, the step of calculating corresponding limit values includes:

calculating a weight limit value of the weight data according to a weight limit value calculation formula, wherein the weight limit value calculation formula is $x_w = \max(|w|)$, where $x_w$ represents the weight limit value, w represents the weight data, and correspondingly, the limit range of the weight data is $(-x_w, +x_w)$; and calculating a feature map limit value of the feature map average data of each layer according to a feature map limit value calculation formula, wherein the feature map limit value calculation formula is $x_f = \max(|F|)$, where $x_f$ represents the feature map limit value, F represents the feature map average data of each layer, and correspondingly, the limit range of the feature map average data of each layer is $(-x_f, +x_f)$.

Another aspect of the embodiments of the present application provides a hardware environment-based data quantization apparatus, including:

a framework data parsing module, configured to perform parsing according to a model file under a current deep learning framework to obtain intermediate computational graph data and weight data that are independent of a hardware environment;

a feature map data calculation module, configured to perform, based on the intermediate computational graph data and the weight data, calculation on image data in an input data set through a process indicated by an intermediate computational graph to obtain feature map data;

a linear quantization module, configured to separately perform uniform quantization on the weight data and the feature map data of each layer according to a preset linear quantization method, and calculate a weight quantization factor and a feature graph quantization factor;

a quantization parameter calculation module, configured to combine the weight quantization factor and the feature map quantization factor to obtain a quantization parameter, wherein the quantization parameter is a parameter that makes hardware use shift instead of division; and a hardware-recognizable data output module, configured to write the quantization parameter and the quantized weight data to a bin file according to a hardware requirement so as to generate quantized file data.

Optionally, the apparatus further includes a reordering module, configured to reorder the quantization parameter and the quantized weight data such that a data format of the quantization parameter and the quantized weight data is a 64-channel parallel format.

The embodiments of the present application also provides a hardware environment-based data quantization apparatus, including a processor configured to execute a computer program stored in a memory to implement any steps of the hardware environment-based data quantization method as described above.

Finally, the embodiments of the present application also provide a computer readable storage medium, storing a hardware environment-based data quantization program that is executed by a processor to implement any steps of the hardware environment-based data quantization method as described above.

The technical solutions provided in the present application have the following advantages. A model file under a deep learning framework is converted into hardware-independent intermediate computational graph data and weight data, whereby various deep learning frameworks may be supported to run on different computer platforms. A linear quantization strategy is used to perform uniform quantization on feature map data of each layer and the weight data, whereby quantization parameters are maximally reduced. Meanwhile, quantization parameters are combined to facilitate hardware inference. Data is all written to a hardware-recognizable bin file. Therefore, the problems in the related art of software redundancy and dependency library conflict caused by supporting a plurality of deep learning frameworks are solved, various interfaces developed to support a plurality of deep learning frameworks may be reduced effectively, and the workload and development difficulty of host-side software are reduced. Furthermore, hardware calculation resources may be reduced, the inference speed of an AI acceleration card may be increased, and the energy consumption may be reduced.

In addition, the embodiments of the present application also provide a corresponding implementation apparatus for the hardware environment-based data quantization method and a computer readable storage medium, thereby further making the method more practicable. The apparatus and the computer readable storage medium have corresponding advantages.

It is to be understood that the above general description and the following detailed description are only exemplary and not intended to limit the present application.

BRIEF DESCRIPTION OF THE DRAWINGS

In order to describe the technical solutions in the embodiments of the present application or the related art more clearly, the drawings required to be used in descriptions about the embodiments or the related art will be introduced briefly below. Apparently, the drawings in the description below are only some embodiments of the present application. Those ordinarily skilled in the art may further obtain other drawings according to these drawings without creative work.

DETAILED DESCRIPTION

In order to make the solutions of the present application understood better by those skilled in the art, the present application will be further described below in detail in combination with the drawings and specific embodiments. Clearly, the described embodiments are not all but only part of embodiments of the present application. All other embodiments obtained by those ordinarily skilled in the art based on the embodiments in the present application without creative work shall fall within the scope of protection of the present application.

Terms "first", "second", "third", "fourth", etc., in the specification, claims, and drawings of the present application are for distinguishing different objects rather than describing a specific sequence. In addition, terms "include" and "have" and any variation thereof are intended to cover nonexclusive inclusions. For example, a process, method, system, product, or device including a series of steps or units is not limited to the listed steps or units but may include steps or units that are not listed.

After the introduction of the technical solutions of the embodiments of the present application, various unrestrictive embodiments of the present application will now be described in detail.

Figure 1:
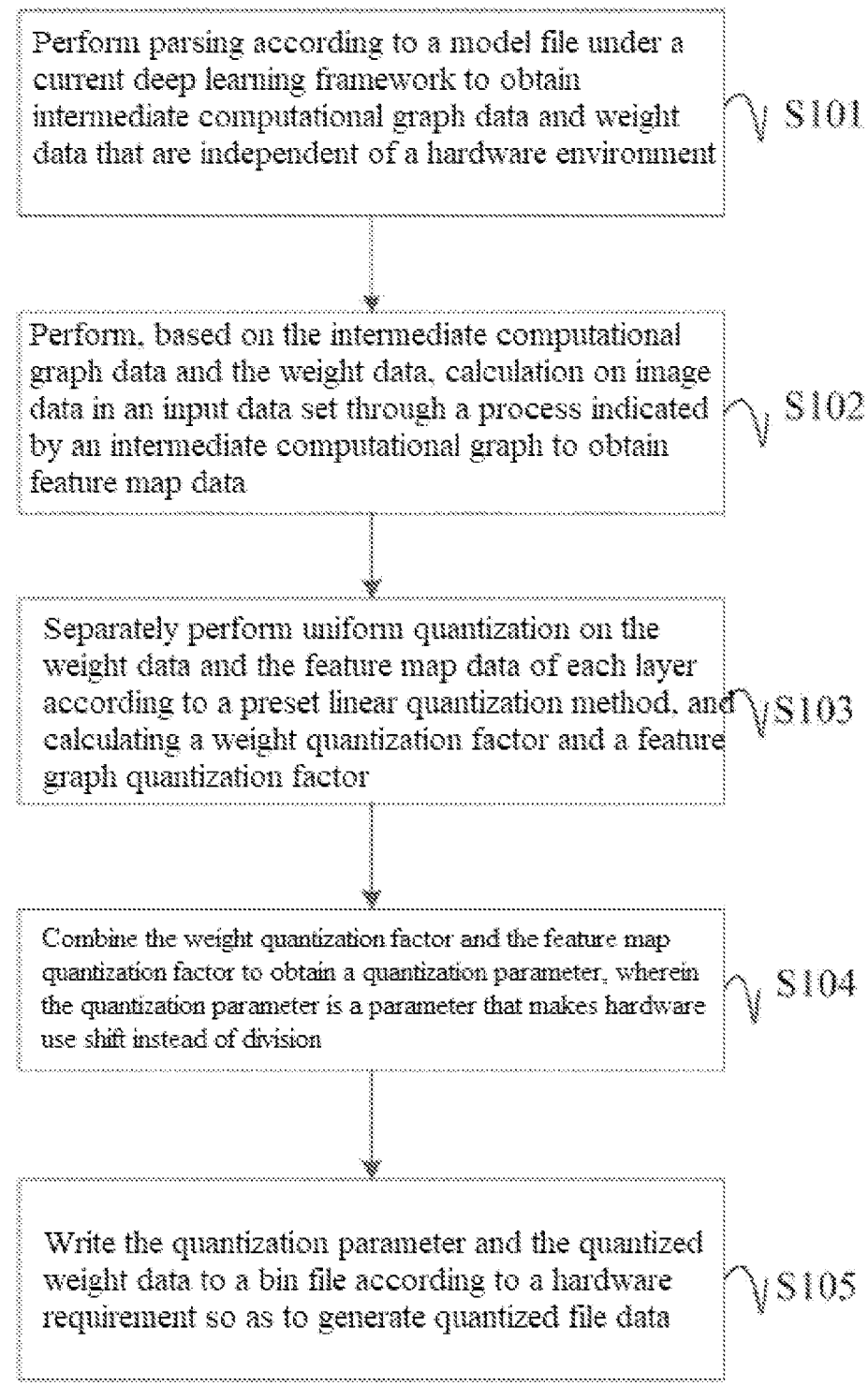
FIG. 1 is a schematic flowchart of a hardware environment-based data quantization method according to an embodiment of the present application.

First, referring to FIG. 1, FIG. 1 is a schematic flowchart of a hardware environment-based data quantization method according to an embodiment of the present application. The embodiment of the present application may include the following contents.

In S101, parsing is performed according to a model file under a current deep learning framework to obtain intermediate computational graph data and weight data that are independent of a hardware environment.

In the present application, the deep learning framework may be any existing deep learning framework, and the model file under the deep learning framework is loaded, such as a pb file under a TensorFlow framework. An intermediate computational graph and weight data may be obtained by parsing with any existing method without affecting the implementation of the present application. For example, model files under different frameworks may be converted into framework-independent intermediate computational graphs by use of an NNVM component of an NNVM compiler, and then operators of the intermediate graphs are executed by use of a TVM component. As such, the hardware independence of various operations of the computational graphs is eliminated, and the present application may support various deep learning frames to run on different computer platforms. The NNVM compiler includes two components based on a TVM stack: the NNVM component that processes intermediate computational graphs and the TVM component that processes tensor operators. The NNVM component (computational graph intermediate representation stack) may be configured to represent working instructions from different frameworks as standard computational graphs and then convert these advanced computational graphs into execution graphs. It presents intermediate computational graphs in a framework-independent form. The TVM component (tensor intermediate representation stack) takes operators in computational graphs as execution objects, and optimizes the operators into operators corresponding to target back-end hardware. Unlike the NNVM component, the TVM component provides a hardware-independent language corresponding to a specific field, thereby simplifying operator execution of a tensor index level.

In S102, calculation is performed, based on the intermediate computational graph data and the weight data, on image data in an input data set through a process indicated by an intermediate computational graph to obtain feature map data.

The input data set may be a training data set under the corresponding deep learning framework in S101. The total number of images in the input data set is not limited in the present application. For example, the input data set may be a data set including 2,000 images. After the input data set is obtained, to facilitate subsequent image processing, image preprocessing may further be performed on image data in the input data. The image preprocessing may be implemented by, for example, performing image layer processing first, then converting the image data into float-type data in a unified manner, and finally performing translation processing, wherein a translation value may be any value ranging from 0 to 255. Under basic operations of a TVM framework, output data of each layer of the computational graph may be calculated for the input image data, namely feature map data of each layer is obtained. The calculated feature map data of each layer may be stored in an internal memory. Calculation results are accumulated, and then an average value of the feature map data of each layer is calculated.

In S103, uniform quantization is separately performed on the weight data and the feature map data of each layer according to a preset linear quantization method, and a weight quantization factor and a feature graph quantization factor are calculated.

In the present application, a quantization process may be performed on the data by using any linear quantization method, and no limits are made thereto in the present application. For example, for an AI acceleration card, int8 data accuracy is used instead of float data accuracy, and a linear quantization method for the data of each layer is used to statistically obtain distributions of the feature map data of each layer and the weight data, limit the data between −X and +X, and then uniformly quantize the data between −127 and +127 of int8. Quantization parameters are combined a single one in a computational inference process of hardware, and the obtained parameter is approximated to make the hardware use shift instead of division.

The weight quantization factor and the feature map quantization factor are calculated according to the corresponding linear quantization method and original data. Herein, the original data refers to the weight data or the feature map data of each layer.

In S104, the weight quantization factor and the feature map quantization factor are combined to obtain a quantization parameter, wherein the quantization parameter is a parameter that makes hardware use shift instead of division.

In the embodiment of the present application, in S103, the distributions of the output data and weight data of each layer of the computational graph are statistically obtained according to the linear quantization method to calculate reasonable quantization parameters. The finally obtained quantization parameter may make the hardware use shift instead of division during inference. The quantization parameter may be, for example, approximately a multiple of 2. That is, the quantization parameter is used as a shift parameter for inference of the hardware. The quantization parameter may be applied to any type of hardware, such as a Field-Programmable Gate Array (FPGA).

In S105, the quantization parameter and the quantized weight data are written to a bin file according to a hardware requirement so as to generate quantized file data.

It can be understood that the present application is based on a hardware environment. To make the data recognizable to hardware and used for data inference, the quantization parameter and the quantized weight data may be written to a hardware-recognizable bin file according to a hardware requirement.

In the technical solution provided in the embodiment of the present application, a model file under a deep learning framework is converted into hardware-independent intermediate computational graph data and weight data, whereby various deep learning frameworks may be supported to run on different computer platforms. A linear quantization strategy is used to perform uniform quantization on feature map data of each layer and the weight data, whereby quantization parameters are maximally reduced. Meanwhile, quantization parameters are combined to facilitate hardware inference. Data is all written to a hardware-recognizable bin file. Therefore, the problems in the related art of software redundancy and dependency library conflict caused by supporting a plurality of deep learning frameworks are solved, various interfaces developed to support a plurality of deep learning frameworks may be reduced effectively, and the workload and development difficulty of host-side software are reduced. Furthermore, hardware calculation resources may be reduced, the inference speed of an AI acceleration card may be increased, and the energy consumption may be reduced.

Figure 2:
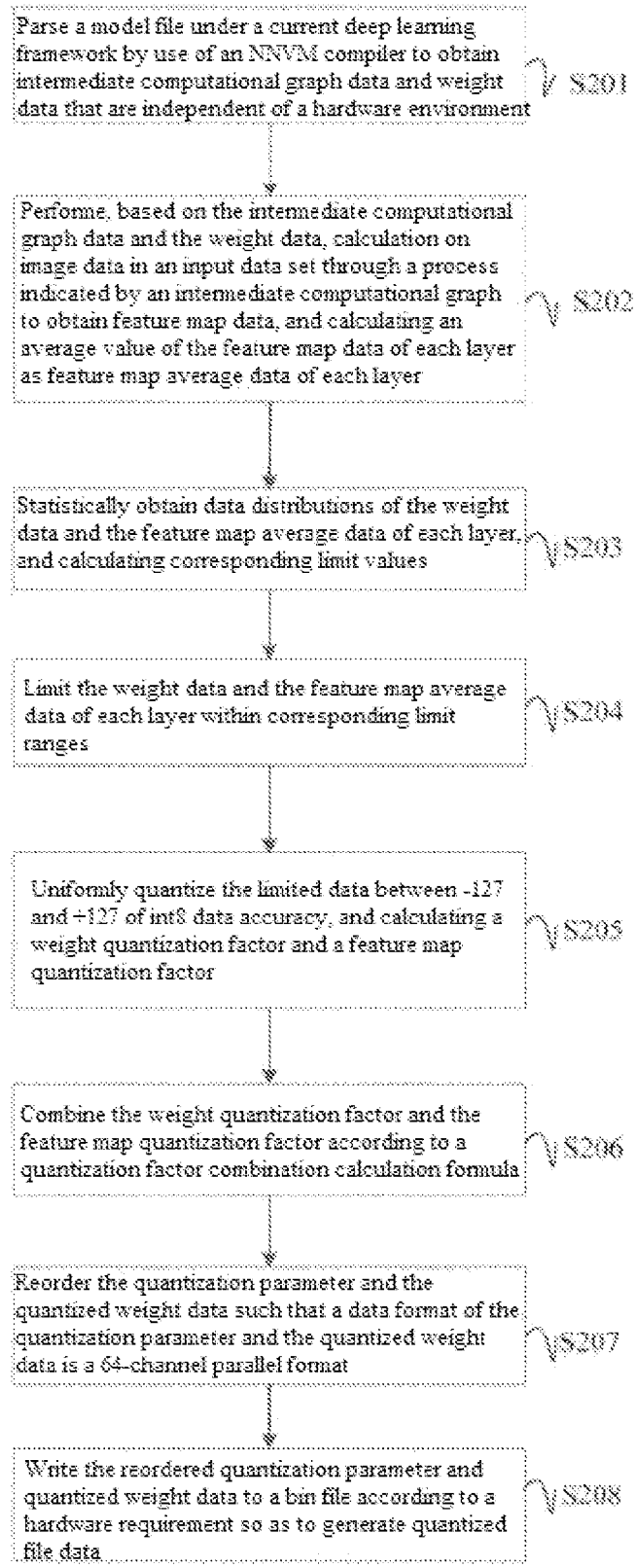
FIG. 2 is a schematic flowchart of another hardware environment-based data quantization method according to an embodiment of the present application.

In addition, the present application also provides another embodiment. Referring to FIG. 2, FIG. 2 is a schematic flowchart of another hardware environment-based data quantization method according to an embodiment of the present application. The embodiment of the present application may be applied to, for example, the quantization of an FPGA-based AI acceleration card to int8 data accuracy, and may specifically include the following contents.

In S201, a model file under a current deep learning framework is parsed by use of an NNVM compiler to obtain intermediate computational graph data and weight data that are independent of a hardware environment.

In this step, a NNVM component in the NNVM compiler is used to parse the model file to obtain the intermediate computational graph data, and a TVM component in the NNVM compiler is used to execute an operator of an intermediate computational graph and calculate a tensor form of the weight data. As such, hardware-independent data is obtained, and limits of a hardware environment are broken.

In S202, calculation is performed, based on the intermediate computational graph data and the weight data, on image data in an input data set through a process indicated by an intermediate computational graph to obtain feature map data, and an average value of the feature map data of each layer is calculated as feature map average data of each layer.

In S203, data distributions of the weight data and the feature map average data of each layer are statistically obtained, and corresponding limit values are calculated.

Specifically, a weight limit value of the weight data may be calculated according to a weight limit value calculation formula. The weight limit value calculation formula is $x_w = \max(|w|)$, where $x_w$ represents the weight limit value, and w represents the weight data. A feature map limit value of the feature map average data of each layer may be calculated according to a feature map limit value calculation formula. The feature map limit value calculation formula is $x_f = \max(|F|)$, where $x_f$ represents the feature map limit value, and F represents the feature map average data of each layer.

In S204, the weight data and the feature map average data of each layer are limited within corresponding limit ranges.

In the embodiment of the present application, the limit range is determined according to the corresponding limit value. Based on the limit values calculated in S203, the limit range of the weight data may be $(-x_w, +x_w)$, and the limit range of the feature map average data of each layer may be $(-x_f, +x_f)$.

In S205, the limited data is uniformly quantized between $-127$ and $+127$ of int8 data accuracy, and a weight quantization factor and a feature map quantization factor are calculated.

After S203 and S204, $$\frac{x'_w}{y_w} = 127, y_w = x'_w/127; \text{ and } \frac{x'_f}{y_f} = 127, y_f = x'_f/127,$$

where $x'_w$ and $x'_f$ represent the quantized weight data and feature map data, $y_w$ represents the weight quantization factor, and $y_f$ represents the feature map quantization factor.

In S206, the weight quantization factor and the feature map quantization factor are combined according to a quantization factor combination calculation formula. The quantization factor combination calculation formula is:

$$y_w * y_f \approx \frac{1}{2^n},$$

where $y_w$ represents the weight quantization factor, $y_f$ represents the feature map quantization factor, and n represents the quantization parameter.

In S207, the quantization parameter and the quantized weight data are reordered such that a data format of the quantization parameter and the quantized weight data is a 64-channel parallel format.

Figure 3:
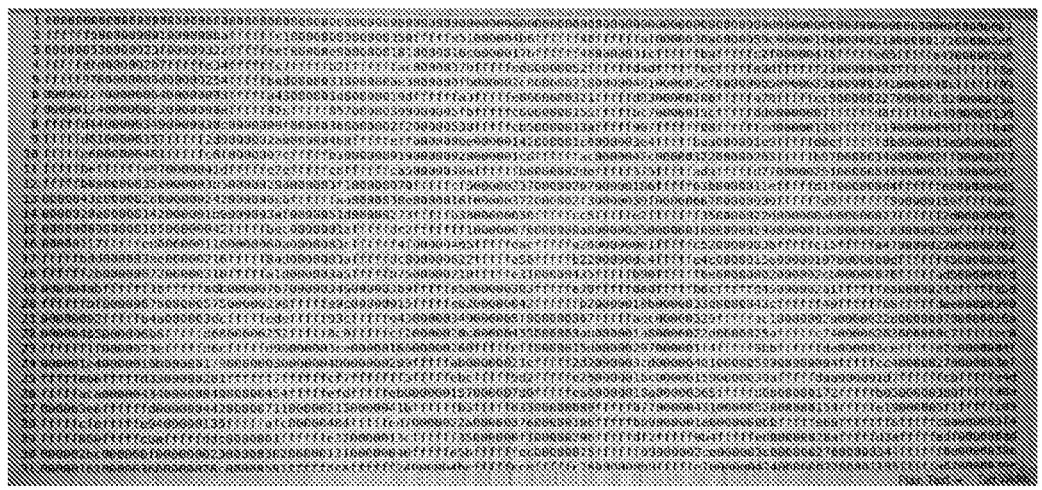
FIG. 3 is a schematic display diagram of reordered data according to an embodiment of the present application.

For an AI acceleration card developed with an FGPA, to maximally utilize hardware resources to facilitate 64-channel parallel calculation operations of hardware, the quantization parameter and the quantized weight data satisfies a 64-channel parallel strategy of the hardware, and the data may be reordered to generate a binary bin file as shown in FIG. 3. As such, when data is input to the hardware for inference, the data may be uniformly distributed to 64 parallel channels for calculation without data format conversion, reducing hardware resources for data conversion.

In S208, the reordered quantization parameter and quantized weight data are written to a bin file according to a hardware requirement so as to generate quantized file data.

In the embodiment of the present application, the implementation methods corresponding to the above-mentioned embodiment of the present application and the same implementation steps as the above-mentioned embodiment may refer to the descriptions in the above-mentioned embodiment, and will not be elaborated herein.

It can be seen from the above that, according to the embodiment of the present application, the problems in the related art of software package redundancy and dependency library conflict caused by supporting a plurality of deep learning frameworks are solved, the workload and development difficulty of host-side software may be reduced effectively, hardware calculation resources may be reduced, the inference speed of an AI acceleration card may be increased, and the energy consumption may be reduced.

It is to be noted that the steps in the present application are executed not strictly in sequence, and as long as satisfying a logical sequence, these steps may be executed at the same time or according to a certain preset sequence. FIGS. 1 to 2 are only schematic and not intended to limit the steps to such execution sequences.

The embodiments of the present application also provide a corresponding apparatus for the hardware environment-based data quantization method, thereby further making the method more practicable. The apparatus may be described from the angles of function module and hardware respectively. The hardware environment-based data quantization apparatus provided in the embodiments of the present application will be introduced below. The hardware environment-based data quantization apparatus described below may make corresponding references mutually with the hardware environment-based data quantization method described above.

Figure 4:
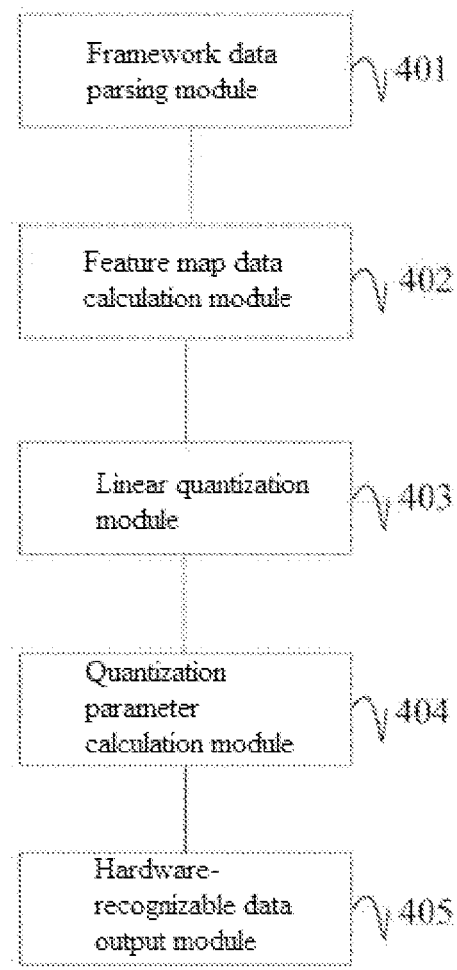
FIG. 4 is a structural diagram of a specific embodiment of a hardware environment-based data quantization apparatus according to an embodiment of the present application.

Based on the angle of function module, referring to FIG. 4, FIG. 4 is a structural diagram of a specific embodiment of a hardware environment-based data quantization apparatus according to an embodiment of the present application. The apparatus may include:

a framework data parsing module 401, configured to perform parsing according to a model file under a current deep learning framework to obtain intermediate computational graph data and weight data that are independent of a hardware environment;

a feature map data calculation module 402, configured to perform, based on the intermediate computational graph data and the weight data, calculation on image data in an input data set through a process indicated by an intermediate computational graph to obtain feature map data;

a linear quantization module 403, configured to separately perform uniform quantization on the weight data and the feature map data of each layer according to a preset linear quantization method, and calculate a weight quantization factor and a feature graph quantization factor;

a quantization parameter calculation module 404, configured to combine the weight quantization factor and the feature map quantization factor to obtain a quantization parameter, wherein the quantization parameter is a parameter that makes hardware use shift instead of division; and a hardware-recognizable data output module 405, configured to write the quantization parameter and the quantized weight data to a bin file according to a hardware requirement so as to generate quantized file data.

Figure 5:
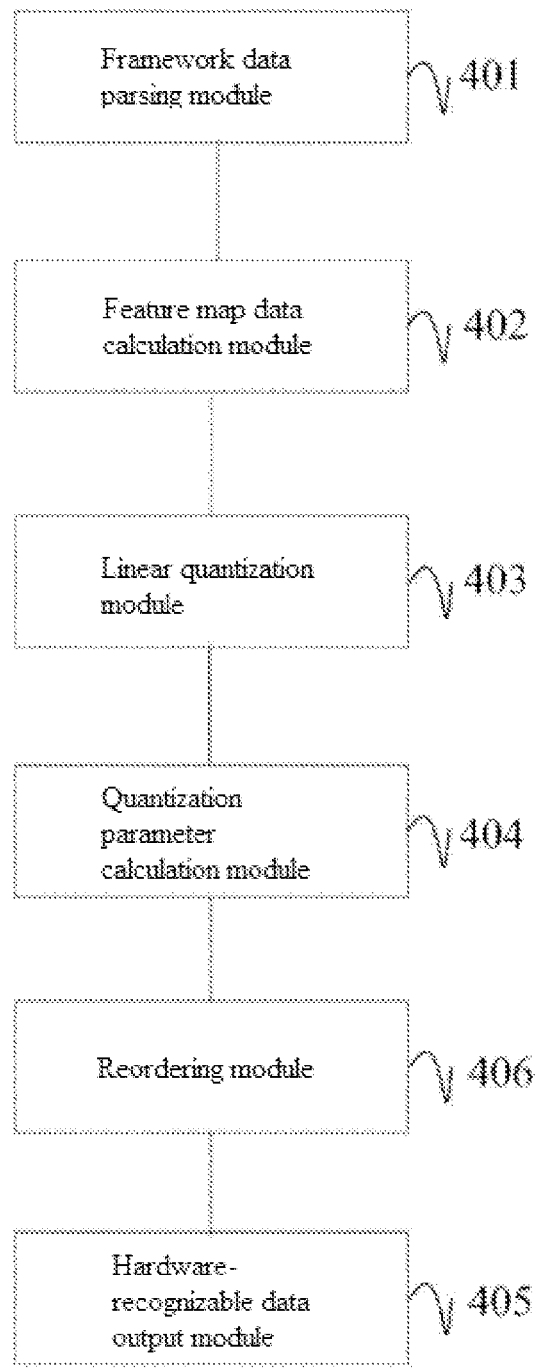
FIG. 5 is a structural diagram of another specific embodiment of a hardware environment-based data quantization apparatus according to an embodiment of the present application.

Optionally, in some embodiments of the present embodiment, referring to FIG. 5, the apparatus may further include, for example, a reordering module 406, configured to reorder the quantization parameter and the quantized weight data such that a data format of the quantization parameter and the quantized weight data is a 64-channel parallel format.

In some other embodiments of the present embodiment, the framework data parsing module 401 may specifically be configured to parse the model file by use of an NNVM component in an NNVM compiler to obtain the intermediate computational graph data, and by use of a TVM component in the NNVM compiler, execute an operator of the intermediate computational graph and calculate a tensor form of the weight data.

In some other embodiments of the present embodiment, the linear quantization module 403 may include:

an average value calculation submodule, configured to calculate an average value of the feature map data of each layer as feature map average data of each layer;

a limit value calculation submodule, configured to statistically obtain data distributions of the weight data and the feature map average data of each layer, and calculate corresponding limit values;

a data limiting submodule, configured to limit the weight data and the feature map average data of each layer within corresponding limit ranges, wherein the limit range is determined according to the corresponding limit value; and a quantization submodule, configured to uniformly quantize the limited data between −127 and +127 of int8 data accuracy, and calculate the weight quantization factor and the feature map quantization factor.

The function of each function module of the hardware environment-based data quantization apparatus as described in the embodiment of the present application may specifically be realized according to the method in the method embodiment, and a specific implementation process thereof may refer to the related descriptions in the method embodiment, and will not be elaborated herein.

It can be seen from the above that, according to the embodiment of the present application, the problems in the related art of software package redundancy and dependency library conflict caused by supporting a plurality of deep learning frameworks are solved, the workload and development difficulty of host-side software may be reduced effectively, hardware calculation resources may be reduced, the inference speed of an AI acceleration card may be increased, and the energy consumption may be reduced.

Figure 6:
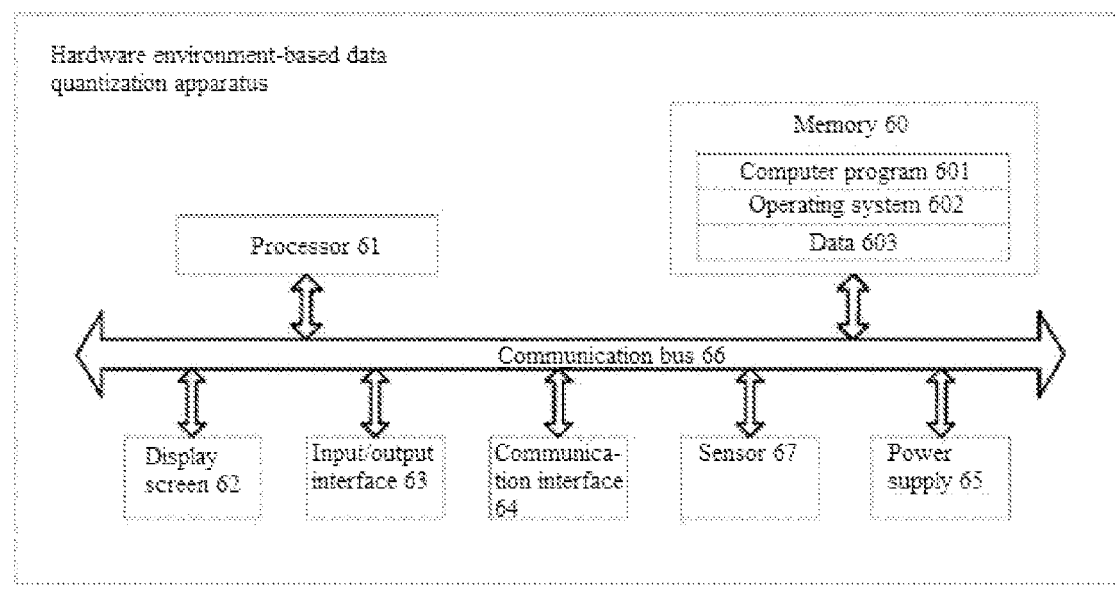
FIG. 6 is a structural diagram of another specific embodiment of a hardware environment-based data quantization apparatus according to an embodiment of the present application.

The hardware environment-based data quantization apparatus mentioned above is described from the angle of function module. Further, the present application also provides a hardware environment-based data quantization apparatus described from the angle of hardware. FIG. 6 is a structural diagram of another hardware environment-based data quantization apparatus according to an embodiment of the present application. As shown in FIG. 6, the apparatus includes a memory 60, configured to store a computer program; and a processor 61, configured to execute the computer program to implement the steps of the hardware environment-based data quantization method mentioned in any one of the above-mentioned embodiments. For example, the computer program may be implemented by compiling with the python language.

The processor 61 may include one or more processing cores, such as a 4-core processor, and an 8-core processor. The processor 61 may be implemented by at least one of hardware forms of a Digital Signal Processor (DSP), an FPGA, and a Programmable Logic Array (PLA). Alternatively, the processor 61 may include a main processor and a co-processor. The main processor, also referred to as Central Processing Unit (CPU), is a processor configured to process data in an awake state. The co-processor is a low-power processor configured to process data in a standby state. In some embodiments, the processor 61 may be integrated with a Graphics Processing Unit (GPU) that is configured to render and draw contents needed to be displayed by a display screen. In some embodiments, the processor 61 may include an AI processor that is configured to process calculation operations about machine learning.

The memory 60 may include one or more computer readable storage media that may be non-transitory. Alternatively, the memory 60 may include a high-speed Random Access Memory (RAM) and a nonvolatile memory, such as one or more disk memory devices and flash memory devices. In the present embodiment, the memory 60 is at least configured to store the following computer program

601 that may be loaded and executed by the processor 61 to implement the related steps of the hardware environment-based data quantization method disclosed in any one of the above-mentioned embodiments. In addition, resources stored in the memory 60 may further include an operating system 602, data 603, etc., that are stored temporarily or permanently. The operating system 602 may include Windows, Unix, Linux, etc. The data 603 may include, but not limited to, data corresponding to test results, etc.

In some embodiments, the hardware environment-based data quantization apparatus may further include a display screen 62, an input/output interface 63, a communication interface 64, a power supply 65, and a communication bus 66.

It can be understood by those skilled in the art that the structure shown in FIG. 6 does not form limitations on the hardware environment-based data quantization apparatus, and more or fewer components than those shown in the figure may be included, such as a sensor 67.

The function of each function module of the hardware environment-based data quantization apparatus as described in the embodiment of the present application may specifically be realized according to the method in the method embodiment, and a specific implementation process thereof may refer to the related descriptions in the method embodiment, and will not be elaborated herein.

It can be seen from the above that, according to the embodiment of the present application, the problems in the related art of software package redundancy and dependency library conflict caused by supporting a plurality of deep learning frameworks are solved, the workload and development difficulty of host-side software may be reduced effectively, hardware calculation resources may be reduced, the inference speed of an AI acceleration card may be increased, and the energy consumption may be reduced.

It can be understood that, when being implemented in form of a software function unit and sold or used as an independent product, the hardware environment-based data quantization method in the embodiment may be stored in a computer readable storage medium. Based on such an understanding, the technical solutions of the present application substantially or parts making contributions to the prior art or all or part of the technical solutions may be embodied in form of a software product, and the computer software product is stored in a storage medium to execute all or part of the steps of the method in each embodiment of the present application. The storage medium includes various media capable of storing program codes, such as a U disk, a mobile hard disk, a Read-Only Memory (ROM), a RAM, an electrically erasable programmable ROM, a register, a hard disk, a mobile disk, a Compact Disk Read-Only Memory (CD-ROM), a magnetic disk, or an optical disk.

Based on this, the embodiments of the present application also provide a computer readable storage medium, storing a hardware environment-based data quantization program that is executed by a processor to implement the steps of the hardware environment-based data quantization method as described any one of the above-mentioned embodiments.

The function of each function module of the computer readable storage medium as described in the embodiment of the present application may specifically be realized according to the method in the method embodiment, and a specific implementation process thereof may refer to the related descriptions in the method embodiment, and will not be elaborated herein.

It can be seen from the above that, according to the embodiment of the present application, the problems in the related art of software package redundancy and dependency library conflict caused by supporting a plurality of deep learning frameworks are solved, the workload and development difficulty of host-side software may be reduced effectively, hardware calculation resources may be reduced, the inference speed of an AI acceleration card may be increased, and the energy consumption may be reduced.

Each embodiment in the specification is described progressively. Descriptions made in each embodiment focus on differences from the other embodiments, and the same or similar parts in each embodiment refer to the other embodiments. The apparatus disclosed in the embodiments corresponds to the method disclosed in the embodiments, and thus is described relatively briefly, and related parts refer to the descriptions about the method.

Professionals may further realize that the units and algorithm steps of each example described in combination with the embodiments disclosed herein may be implemented by electronic hardware, computer software, or a combination thereof. In order to describe the interchangeability of hardware and software clearly, the compositions and steps of each example have been described generally in the foregoing descriptions according to functions. Whether these functions are executed by hardware or software depends on specific applications and design constraints of the technical solutions. Professionals may realize the described functions for each specific application by use of different methods, but such realization shall fall within the scope of the present application.

The hardware environment-based data quantization method and apparatus and computer readable storage medium provided in the present application are introduced above in detail. The principle and embodiments of the present application are described herein with specific examples, and the descriptions about the above embodiments are only for helping in understanding the method and core idea of the present application. It is to be pointed out that those ordinarily skilled in the art may further make a plurality of improvements and modifications to the present application without departing from the principle of the present application, and these improvements and modifications shall also fall within the scope of protection of the claims of the present application.

What is claimed is:

1. A data quantization method, comprising:
performing parsing according to a model file under a current deep learning framework to obtain intermediate computational graph data and weight data that are independent of a hardware environment;
performing, based on the intermediate computational graph data and the weight data, calculation on image data in an input data set through a process indicated by an intermediate computational graph to obtain feature map data;
separately performing uniform quantization on the weight data and the feature map data of each layer according to a preset linear quantization method, and calculating a weight quantization factor and a feature map quantization factor;
combining the weight quantization factor and the feature map quantization factor to obtain a quantization parameter, wherein the quantization parameter is a parameter that makes hardware use shift instead of division; and
writing the quantization parameter and quantized weight data to a bin file according to a hardware requirement so as to generate quantized file data.

2. The data quantization method according to claim 1, wherein before the step of writing the quantization parameter and the quantized weight data to the bin file according to the hardware requirement, the method further comprises:

reordering the quantization parameter and the quantized weight data such that a data format of the quantization parameter and the quantized weight data is a 64-channel parallel format.

3. The data quantization method according to claim 2, wherein the step of performing parsing to obtain the intermediate computational graph data and the weight data of the current deep learning framework comprises:

parsing the model file by use of a Neural Network Virtual Machine (NNVM) component in an NNVM compiler to obtain the intermediate computational graph data; and by use of a Tensor Virtual Machine (TVM) component in the NNVM compiler, executing an operator of the intermediate computational graph, and calculating a tensor form of the weight data.

4. The data quantization method according to claim 3, wherein the step of combining the weight quantization factor and the feature map quantization factor comprises:

combining the weight quantization factor and the feature map quantization factor according to a quantization factor combination calculation formula, wherein the quantization factor combination calculation formula is:

$$y_w * y_f \approx \frac{1}{2^n},$$

wherein $y_w$ represents the weight quantization factor, $y_f$ represents the feature map quantization factor, and n represents the quantization parameter.

5. The data quantization method according to claim 4, wherein the step of separately performing uniform quantization on the weight data and the feature map data of each layer according to the preset linear quantization method and calculating the weight quantization factor and the feature map quantization factor comprises:

calculating an average value of the feature map data of each layer as feature map average data of each layer;
statistically obtaining data distributions of the weight data and the feature map average data of each layer, and calculating corresponding limit values;
limiting the weight data and the feature map average data of each layer within corresponding limit ranges to yield limited data, wherein the limit range is determined according to the corresponding limit value; and
uniformly quantizing the limited data between −127 and +127 of int8 data accuracy, and calculating the weight quantization factor and the feature map quantization factor.

6. The data quantization method according to claim 5, wherein the step of calculating the corresponding limit values comprises:

calculating a weight limit value of the weight data according to a weight limit value calculation formula, wherein the weight limit value calculation formula is $x_w$=max(|w|), where $x_w$ represents the weight limit value, w represents the weight data, and correspondingly, the limit range of the weight data is $(-x_w, +x_w)$; and
calculating a feature map limit value of the feature map average data of each layer according to a feature map limit value calculation formula, wherein the feature map limit value calculation formula is $x_f$=max(|F|), where $x_f$ represents the feature map limit value, F represents the feature map average data of each layer, and correspondingly, the limit range of the feature map average data of each layer is $(-x_f, +x_f)$.

7. The data quantization method according to claim 1, wherein the quantization parameter is a multiple of 2.

8. A data quantization apparatus, comprising a processor configured to execute a computer program stored in a memory to implement steps of:

performing parsing according to a model file under a current deep learning framework to obtain intermediate computational graph data and weight data that are independent of a hardware environment;
performing, based on the intermediate computational graph data and the weight data, calculation on image data in an input data set through a process indicated by an intermediate computational graph to obtain feature map data;
separately performing uniform quantization on the weight data and the feature map data of each layer according to a preset linear quantization method, and calculating a weight quantization factor and a feature map quantization factor;
combining the weight quantization factor and the feature map quantization factor to obtain a quantization parameter, wherein the quantization parameter is a parameter that makes hardware use shift instead of division; and
writing the quantization parameter and quantized weight data to a bin file according to a hardware requirement so as to generate quantized file data.

9. The data quantization apparatus according to claim 8, wherein the processor is configured to implement following step:

reordering the quantization parameter and the quantized weight data such that a data format of the quantization parameter and the quantized weight data is a 64-channel parallel format.

10. The data quantization apparatus according to claim 9, wherein the processor is configured to implement following steps:

parsing the model file by use of a Neural Network Virtual Machine (NNVM) component in an NNVM compiler to obtain the intermediate computational graph data; and by use of a Tensor Virtual Machine (TVM) component in the NNVM compiler, executing an operator of the intermediate computational graph, and calculating a tensor form of the weight data.

11. The data quantization apparatus according to claim 10, wherein the processor is configured to implement following steps:

combining the weight quantization factor and the feature map quantization factor according to a quantization factor combination calculation formula, wherein the quantization factor combination calculation formula is:

$$y_w * y_f \approx \frac{1}{2^n},$$

wherein $y_w$ represents the weight quantization factor, $y_f$ represents the feature map quantization factor, and n represents the quantization parameter.

12. The data quantization apparatus according to claim 11, wherein the processor is configured to implement following steps:
- calculating an average value of the feature map data of each layer as feature map average data of each layer;
- statistically obtaining data distributions of the weight data and the feature map average data of each layer, and calculating corresponding limit values;
- limiting the weight data and the feature map average data of each layer within corresponding limit ranges to yield limited data, wherein the limit range is determined according to the corresponding limit value; and
- uniformly quantizing the limited data between −127 and +127 of int8 data accuracy, and calculating the weight quantization factor and the feature map quantization factor.

13. The data quantization apparatus according to claim 12, wherein the processor is configured to implement following steps:
- calculating a weight limit value of the weight data according to a weight limit value calculation formula, wherein the weight limit value calculation formula is $x_w = \max(|w|)$, where $x_w$ represents the weight limit value, w represents the weight data, and correspondingly, the limit range of the weight data is $(-x_w, +x_w)$; and
- calculating a feature map limit value of the feature map average data of each layer according to a feature map limit value calculation formula, wherein the feature map limit value calculation formula is $x_f = \max(|F|)$, where $x_f$ represents the feature map limit value, F represents the feature map average data of each layer, and correspondingly, the limit range of the feature map average data of each layer is $(-x_f, +x_f)$.

14. The data quantization apparatus according to claim 8, wherein the quantization parameter is a multiple of 2.

15. A non-transitory computer readable storage medium configured to store a data quantization program that is executed by a processor to implement steps of:
- performing parsing according to a model file under a current deep learning framework to obtain intermediate computational graph data and weight data that are independent of a hardware environment;
- performing, based on the intermediate computational graph data and the weight data, calculation on image data in an input data set through a process indicated by an intermediate computational graph to obtain feature map data,
- separately performing uniform quantization on the weight data and the feature map data of each layer according to a preset linear quantization method, and calculating a weight quantization factor and a feature map quantization factor;
- combining the weight quantization factor and the feature map quantization factor to obtain a quantization parameter, wherein the quantization parameter is a parameter that makes hardware use shift instead of division; and
- writing the quantization parameter and quantized weight data to a bin file according to a hardware requirement so as to generate quantized file data.

16. The non-transitory computer readable storage medium according to claim 15, wherein the data quantization program executed by the processor is configured to implement following step:
- reordering the quantization parameter and the quantized weight data such that a data format of the quantization parameter and the quantized weight data is a 64-channel parallel format.

17. The non-transitory computer readable storage medium according to claim 16, wherein the data quantization program executed by the processor is configured to implement following steps:
- parsing the model file by use of a Neural Network Virtual Machine (NNVM) component in an NNVM compiler to obtain the intermediate computational graph data; and
- by use of a Tensor Virtual Machine (TVM) component in the NNVM compiler, executing an operator of the intermediate computational graph, and calculating a tensor form of the weight data.

18. The non-transitory computer readable storage medium according to claim 17, wherein the data quantization program executed by the processor is configured to implement following steps:
- combining the weight quantization factor and the feature map quantization factor according to a quantization factor combination calculation formula, wherein the quantization factor combination calculation formula is:

$$y_w * y_f \approx \frac{1}{2^n},$$

wherein $y_w$ represents the weight quantization factor, $y_f$ represents the feature map quantization factor, and n represents the quantization parameter.

19. The non-transitory computer readable storage medium according to claim 18, wherein the data quantization program executed by the processor is configured to implement following steps:
- calculating an average value of the feature map data of each layer as feature map average data of each layer;
- statistically obtaining data distributions of the weight data and the feature map average data of each layer, and calculating corresponding limit values;
- limiting the weight data and the feature map average data of each layer within corresponding limit ranges to yield limited data, wherein the limit range is determined according to the corresponding limit value; and
- uniformly quantizing the limited data between −127 and +127 of int8 data accuracy, and calculating the weight quantization factor and the feature map quantization factor.

20. The non-transitory computer readable storage medium according to claim 19, wherein the data quantization program executed by the processor is configured to implement following steps:
- calculating a weight limit value of the weight data according to a weight limit value calculation formula, wherein the weight limit value calculation formula is $x_w = \max(|w|)$, where $x_w$ represents the weight limit value, w represents the weight data, and correspondingly, the limit range of the weight data is $(-x_w, +x_w)$; and
- calculating a feature map limit value of the feature map average data of each layer according to a feature map limit value calculation formula, wherein the feature map limit value calculation formula is $x_f = \max(|F|)$, where $x_f$ represents the feature map limit value, F represents the feature map average data of each layer, and correspondingly, the limit range of the feature map average data of each layer is $(-x_f, +x_f)$.

* * * * *